United States Patent [19]
Kaneko

[11] Patent Number: 5,236,147
[45] Date of Patent: Aug. 17, 1993

[54] FISHING REEL WITH COMPUTER LINE LENGTH DISPLAY

[75] Inventor: Kyoichi Kaneko, Tokyo, Japan

[73] Assignee: Daiwa Seiko, Inc., Tokyo, Japan

[21] Appl. No.: 980,110

[22] Filed: Nov. 23, 1992

Related U.S. Application Data

[63] Continuation of Ser. No. 596,872, Oct. 12, 1990, abandoned.

[30] Foreign Application Priority Data

May 10, 1990 [JP] Japan .................. 2-48847[U]

[51] Int. Cl.$^5$ ........................................ A01K 89/015
[52] U.S. Cl. ................................ 242/223; 242/309
[58] Field of Search ................ 242/223, 309, 305

[56] References Cited

U.S. PATENT DOCUMENTS

| | | | |
|---|---|---|---|
| 2,957,641 | 10/1960 | Humphrey | 242/309 |
| 3,465,982 | 9/1969 | Coshow | 242/309 |
| 4,502,241 | 3/1985 | Haapala | 242/307 X |
| 4,620,371 | 11/1986 | Murakami | 242/223 |
| 4,634,072 | 1/1987 | Stealy | 242/223 |
| 4,697,758 | 10/1987 | Hirose et al. | 242/223 |
| 4,733,381 | 3/1988 | Runyon | 242/309 |

FOREIGN PATENT DOCUMENTS

| | | |
|---|---|---|
| 55-99676 | 7/1980 | Japan . |
| 55-140373 | 10/1980 | Japan . |
| 56-48839 | 5/1981 | Japan . |
| 59-117365 | 8/1984 | Japan . |
| 60-52704 | 3/1985 | Japan . |
| 60-98377 | 7/1985 | Japan . |
| 60-114666 | 8/1985 | Japan . |
| 60-244247 | 12/1985 | Japan . |
| 61-99813 | 5/1986 | Japan . |
| 57-155931 | 9/1992 | Japan . |

*Primary Examiner*—Katherine Matecki
*Attorney, Agent, or Firm*—Kalish & Gilster

[57] ABSTRACT

A fishing reel is provided with a line length measuring device to determine the unwound or wound amount of the fishing line based on the number of spool rotations. It is provided with a micro computer-implemented function to detect when the fishing line would onto the spool reaches a prescribed winding amount. The line length is measured by micro computer execution of a formula for line length calculation determined by the total number of spool rotations when the fishing line is wound to a prescribed winding diameter level of the spool, according to the actual number of spool rotations when the line is unwound or wound, as counted with an incremental/decremental counter. Further, when the fishing line reaches the prescribed winding amount, the prescribed winding amount detector so informs.

6 Claims, 10 Drawing Sheets

FISHING REEL WITH COMPUTER LINE LENGTH DISPLAY

This application is continuation, of application Ser. No. 07/596,872, filed Oct. 12, 1990, now abandoned.

BACKGROUND OF THE INVENTION

1. Field of the Invention

This invention relates to a fishing reel, and more particularly to a fishing reel provided with a line length measuring device to determine unwound amount and wound amount of the fishing line based on the number of spool revolutions.

2. Description of the Prior Art

Recent fishing reels are provided with a mechanism to measure the length of fishing line unwound or wound onto a spool so that the line accurately reaches the shelf where fish are gathering and that the distance to the fishing point in casting is indicated.

Conventionally, the unwound or wound amount of fishing line has been measured, as disclosed in the Japanese Application Laid-open No. 57-155931 for example, by detecting the spool rotations with a sensor and counting the pulse signal generated at the sensor once per spool rotation The counted value is sent to a microcomputer for each operation cycle to operate the line length, and the operation result is output to the display unit for line length indication.

However, for a conventional line length measuring device as described above, line winding diameter at the spool decreases as the line is unwound and increases as the line is wound, resulting in varying unwound or wound length per spool rotation. Accordingly, the real line length cannot be obtained by multiplying the counted pulses generated once per rotation by the line length for one rotation of the spool. This causes a large difference between the indicated value and the actual unwound or wound length. In addition, when a fishing line of different diameter or different type is used, increase or decrease ratio of the line winding diameter for unwinding or winding changes and the real line length cannot be determined.

SUMMARY OF THE INVENTION

This invention is to solve the conventional problem as above. An object of the invention is to provide a fishing reel capable of measuring the line length with extremely small error just by inputting the counted number of spool rotations regardless of the diameter or type of the fishing line used.

Another object of the invention is to provide a fishing reel greatly improving the practicability under a wide range of fishing conditions by highly accurate measurement of unwound or wound line length regardless of the diameter or type of the fishing line.

A still another object of the invention is to provide a fishing reel to which the total number of spool rotations when the winding reaches the prescribed diameter can be input with one pressing of a switch, thereby facilitating the data input operation.

A further object of the invention is to provide a fishing reel which is assured to detect the reaching of the fishing line to the prescribed winding amount.

An even further object of the invention is to provide a fishing reel to which the total number of spool rotations for the prescribed winding diameter can be surely and easily input, with preventing problems such as biting, twisting and backlash caused by excessive winding of the fishing line.

DESCRIPTION OF THE PREFERRED EMBODIMENT OF THE INVENTION

Figure 1:
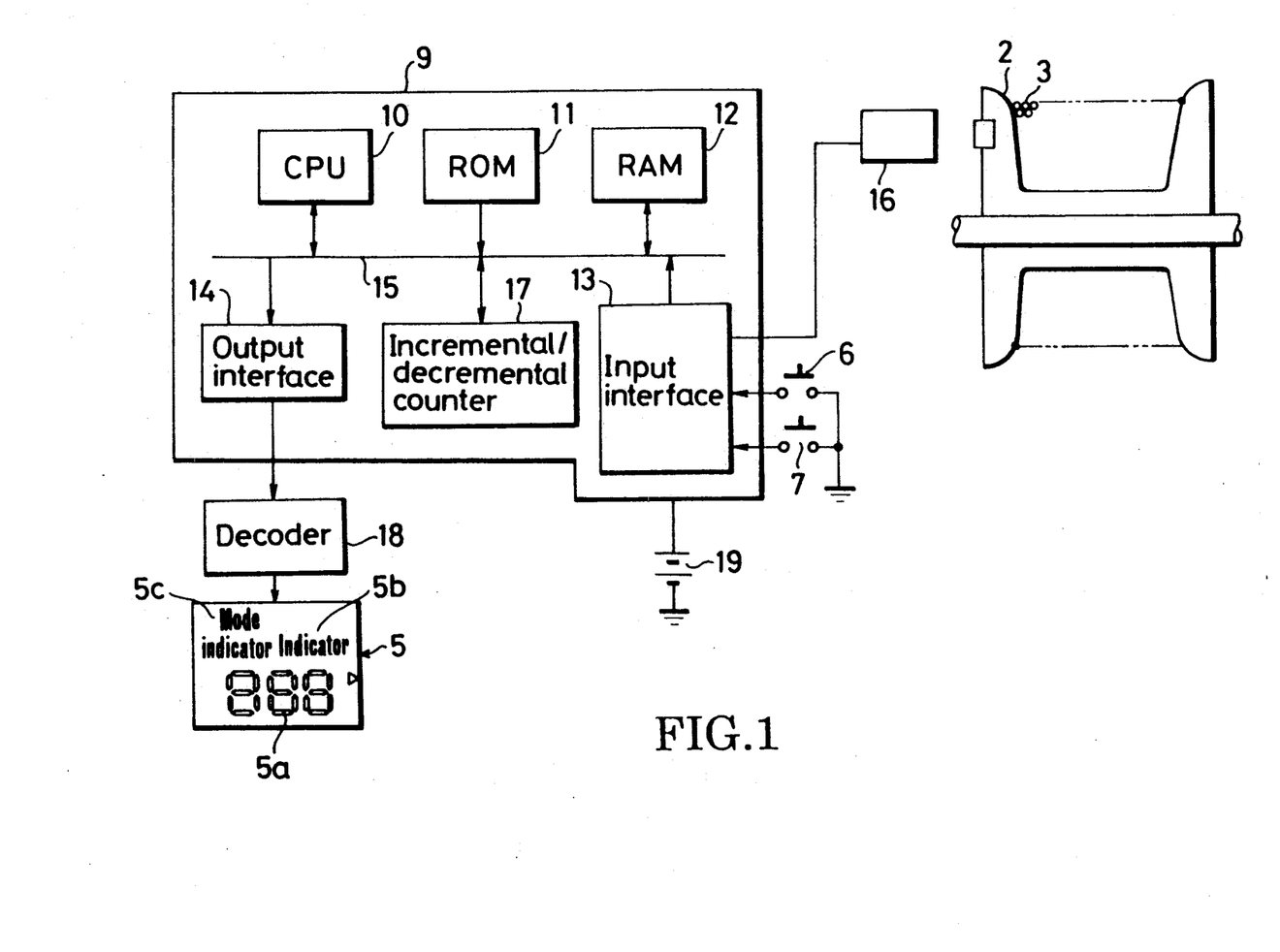
FIG. 1 shows an overall configuration of a fishing reel provided with a line length measuring device according to a first embodiment of the invention.
Figure 2:
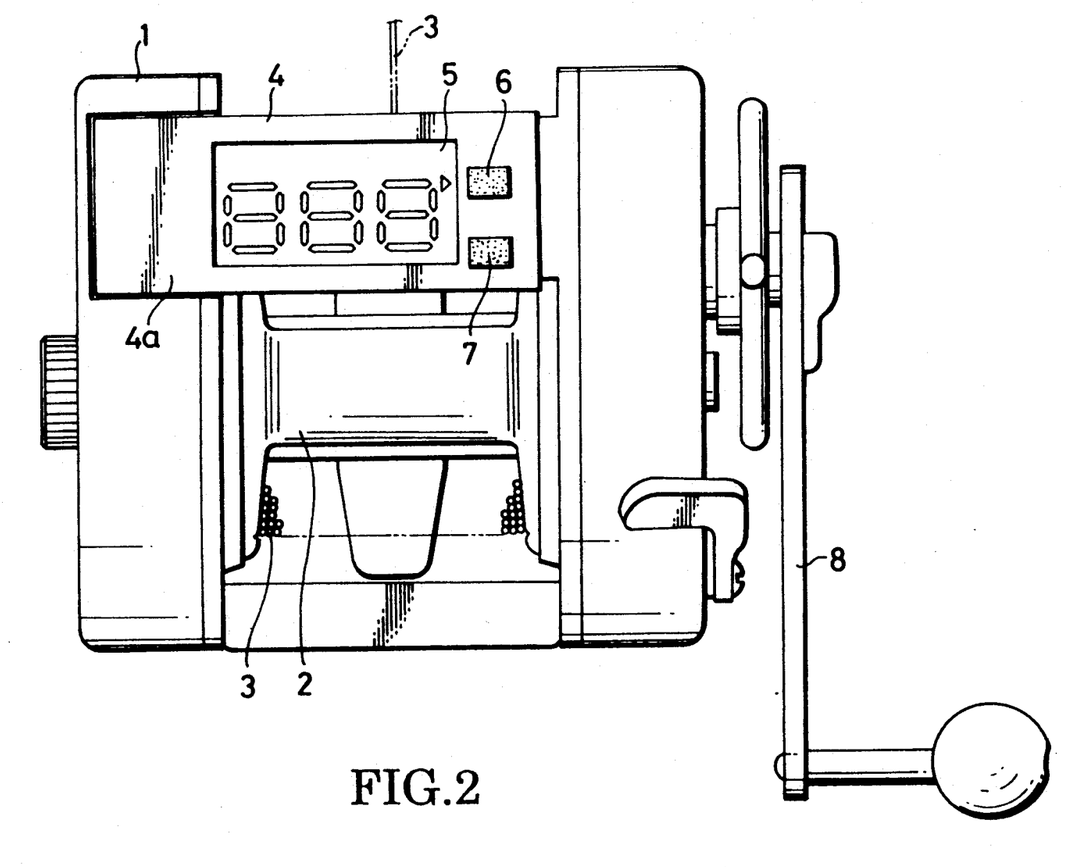
FIG. 2 is a plan view of a fishing reel provided with a line length measuring device according to a first embodiment of the invention.
Figure 3:
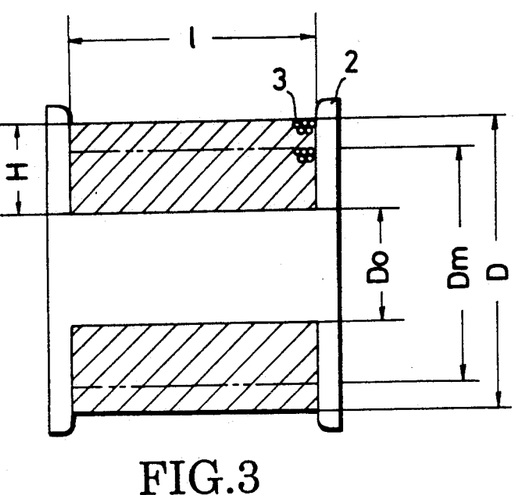
FIG. 3 illustrates a spool in a first embodiment of the invention.

FIGS. 1 to 3 show a first embodiment of the present invention. In FIG. 2, the reference numeral 1 indicates a reel, 2 indicates a spool rotationally mounted to the reel 1, and the spool 2 is wound with a fishing line 3. The numeral 4 is a waterproof flat box integrally mounted on the top of the reel 1. The box 4 has a top panel 4a provided with a display unit 5, mode switch 6 and data input switch 7. In the box 4, a microcomputer used to operate the line length and batteries (described later) are contained in watertight manner. The numeral 8 indicates a handle to rotate the spool 2 for winding.

In FIG. 1, the numeral 9 is a microcomputer to operate and display the line length and control the data input. This microcomputer 9 is provided with a CPU (Central Processing Unit) 10 to control the program memory, data memory and input/output devices and to execute the operation and transfer processes needed for processing of a given job, a ROM 11 to store the operation processing program and line length calculation formula corresponding to the shape of the spool 2, a RAM 12 to store data such as results of operation by CPU 10, and the input interface 13 and output interface 14. The ROM 11, RAM 12 and interfaces 13 and 14 are connected with the CPU 10 via a bus 15.

The numeral 16 shows a sensor to detect the rotation and rotation direction of the spool 2. The sensor 16 is connected with the input interface 13 of the microcomputer 9. The signal to judge whether the rotation of the spool 2 is forward or reverse is output from the sensor 16 and sent to the CPU 10 via the input interface 13, causing an incorporated incremental/decremental counter 17 to be set at incremental or decremental status, in order that the rotation pulse signal of the spool 2 sent from the sensor 16 via the input interface 13 is used for increasing or decreasing of the count.

To the input interface 13 are connected the data switch 6 and data input switch 7 to switch the microcomputer 9 to data input mode, line length indication mode and data correction mode.

To the output interface 14, the display unit 5 is connected via a decoder 18. The display unit 5 is provided with a digital display 5a for digital indication of line length and total number of spool 2 rotations when the fishing line 3 is wound onto the spool 2 to a prescribed winding diameter level, and an indicator 5b to show that data is being input and a mode indicator 5c to indicate the working of correction mode. Further, the numeral 19 is a cell battery for operation of the microcomputer 9 and the display unit 5.

Referring now to FIG. 3, the figure illustrates the relation among the number of spool 2 rotations and the outer diameter of the fishing line 3 winding on the spool 2 and the line length, when the spool is the straight type where the winding width 1 of the spool 2 does not change.

In the figure, D represents the diameter of the fishing line 3 when the winding is at the level corresponding to diameter D prescribed for the fishing line 3. $D_0$ represents the bottom diameter of the spool 2. H is the groove depth of the spool 2 until the winding diameter reaches the prescribed level. $D_m$ is the outer diameter of the fishing line 3 winding, which varies corresponding to the unwinding and winding of the fishing line 3. N shows the total number of rotations for the spool 2 when the fishing line 3 is wound onto the spool 2 up to the prescribed winding diameter level H. $N_a$ represents the actual number of rotations of the spool 2 when it is rotated in unwinding or winding of the fishing line 3.

If the spool 2 rotates $N_a$ times and the winding diameter changes from D to $D_m$ correspondingly, the unwound line length L is obtained by the formula below:

$$L = a/N\, N_a^2 + bN_a \tag{1}$$

where a is H and b is D in this formula (1).

In the above formula (1) to determine the line length, D and H are constants predetermined according to the shape of the spool 2, N is a constant to be determined according to the line type and $N_a$ is a variable which varies according to the rotation of the spool 2.

Thus, by storing the above formula (1) in the ROM 11 and executing it, unwound or wound line length according to the actual number of rotations $N_a$ of the spool 2 can be determined.

Figure 4:
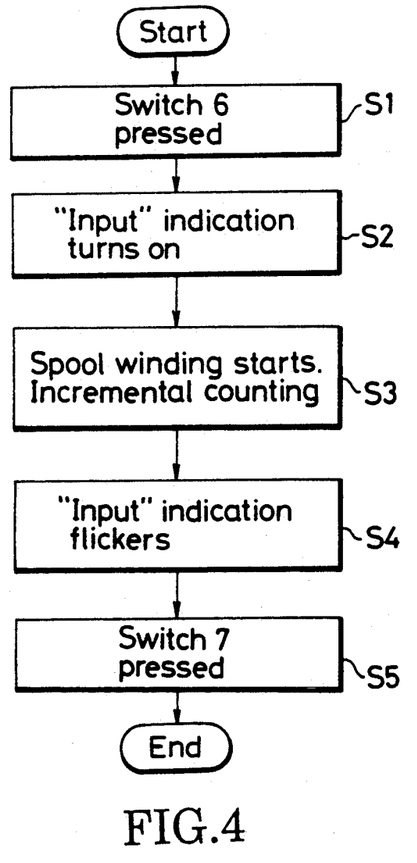
FIG. 4 is a flowchart showing the data input procedures in a first embodiment of the present invention.
Figure 5:
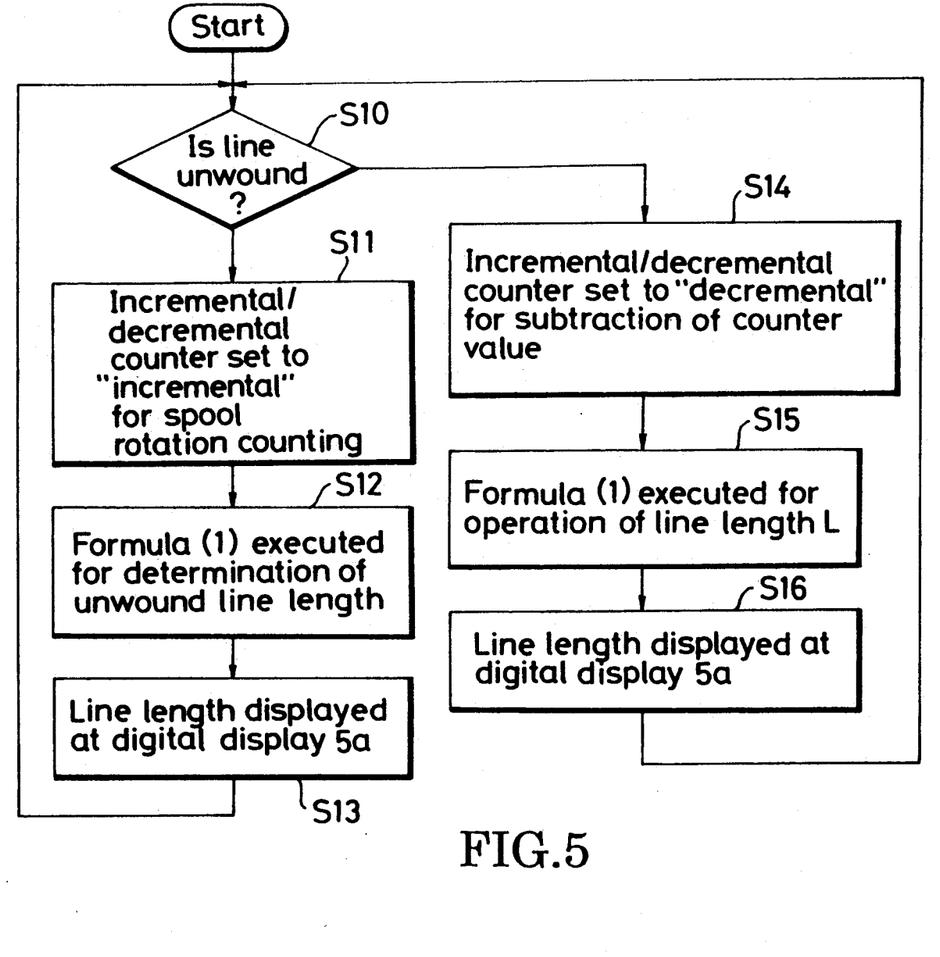
FIG. 5 is a flowchart showing the procedures of line length measurement and display in a first embodiment of the present invention.
Figure 6:
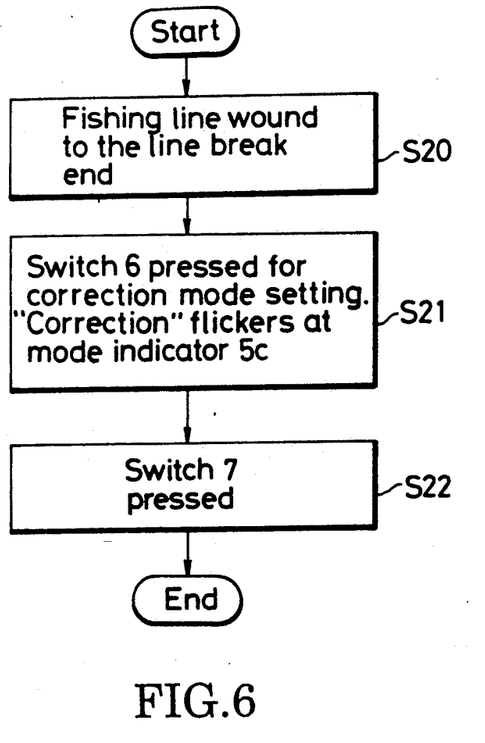
FIG. 6 is a flowchart showing the procedures of correction for line break in a first embodiment of the invention.

The operation in this preferred embodiment is now described referring to the flowcharts shown as FIGS. 4 to 6.

First, description is given for a case where the fishing line 3 is wound onto the spool 2 from the bottom diameter $D_0$ to the level D and the total number or rotations N of the spool 2 is input according to the procedures given in FIG. 4.

When the cell battery 19 is connected to the microcomputer 9, the microcomputer 9 is initialized and put to the start status.

When the mode switch 6 is pressed (Step S1) under such situation, the microcomputer 9 is set to the total spool rotations input mode and the indicator 5b of the display unit 5 turns on "input" indication (Step S2).

Next, with an end of the fishing line 3 connected to the bottom diameter of the spool 2, the spool 2 is rotated by the rotating operation with the handle 8 to gradually wind the fishing line 3 onto the spool 2. At this point, a line guide with a level winder mechanism (not shown) performs traverse operation in the direction of the spool 2 width, synchronizing with the rotations of the spool 2, and the fishing line 3 is wound onto the spool 2 uniformly in winding level and density.

On the other hand, when the spool 2 rotates in the direction to wind the line, the incremental/decremental counter 17 is set to the incremental status, and the pulse signal output from the sensor 16 once per rotation is, via the input interface 13, sent to the incremental/decremental counter 17 for incremental counting (Step S3). In the next step S4, when the counted value of the incremental/decremental counter 17 reaches a prescribed value, 500 for example, the indicator 5b of the display unit 5 flickers the indication "input" to show that the total number of rotations N is being counted.

When the fishing line 3 is wound onto the spool 2 up to the prescribed winding level diameter D of the spool 2, winding of the fishing line 3 is suspended, and at the next step S5, the data input switch 7 is pressed. Then, the value of the incremental/decremental counter 17 is stored in the RAM 12 as the total number of spool 2 rotations N. The indication "input" at the indicator 5b of the display unit 5 disappears and the microcomputer 9 is set to the display mode. At this point, the digital display 5a of the display unit 5 indicates "0".

Now referring to the procedures in FIG. 5, line length measuring operation is described.

When the program in FIG. 5 starts( the first operation is to judge whether the fishing line 3 is being unwound or wound at the Step S10. When it is judged that the fishing line 3 is being unwound, forward rotation of the spool 2 with the unwinding of the fishing line 3 causes the sensor 16 to send the forward rotation signal to the CPU 10 via the input interface 13, which sets the incremental/decremental counter 17 to incremental status. Now, the pulse signal output from the sensor 16 once per spool rotation according to the rotation of the spool 2 is sent to the incremental/decremental counter 17 via the input interface 13 for incremental counting (Step S11).

At the next step S12, the count Na of the incremental/decremental counter 17 is sent to the CPU 10 for each operation cycle of the microcomputer 9 for line length operation using the above formula (1) and the operation result is, via the output interface 14 and decoder 18, output to the display unit 5. The unwound line length L of the fishing line 3 is digitally displayed at the display unit 5 (Step S13).

On the other hand, when it is judged that the fishing line is being wound at the Step S10, reverse rotation of the spool 2 with the winding of the fishing line 3 causes the sensor 16 to send the reverse rotation signal to CPU 10 via the input interface 13, which sets the incremental/decremental counter 17 to decremental status. Now, the pulse signal output from the sensor 16 once per spool rotation according to the reverse rotation of the spool 2 is via the input interface 13 sent to the incremental/decremental counter 17, where the decremental operation performs subtraction from the value counted at the time of unwinding (Step S14). Then, at the next step S15, the count Na of the incremental/decremental counter 17 is sent to the CPU 10 for each operation cycle of the microcomputer 9 for execution of the above formula (1) where the wound line length, or the line length L obtained by subtracting the wound line length from the unwound line length is determined and digitally output to the digital display 5a of the display unit 5 (Step S16).

Figure 7:
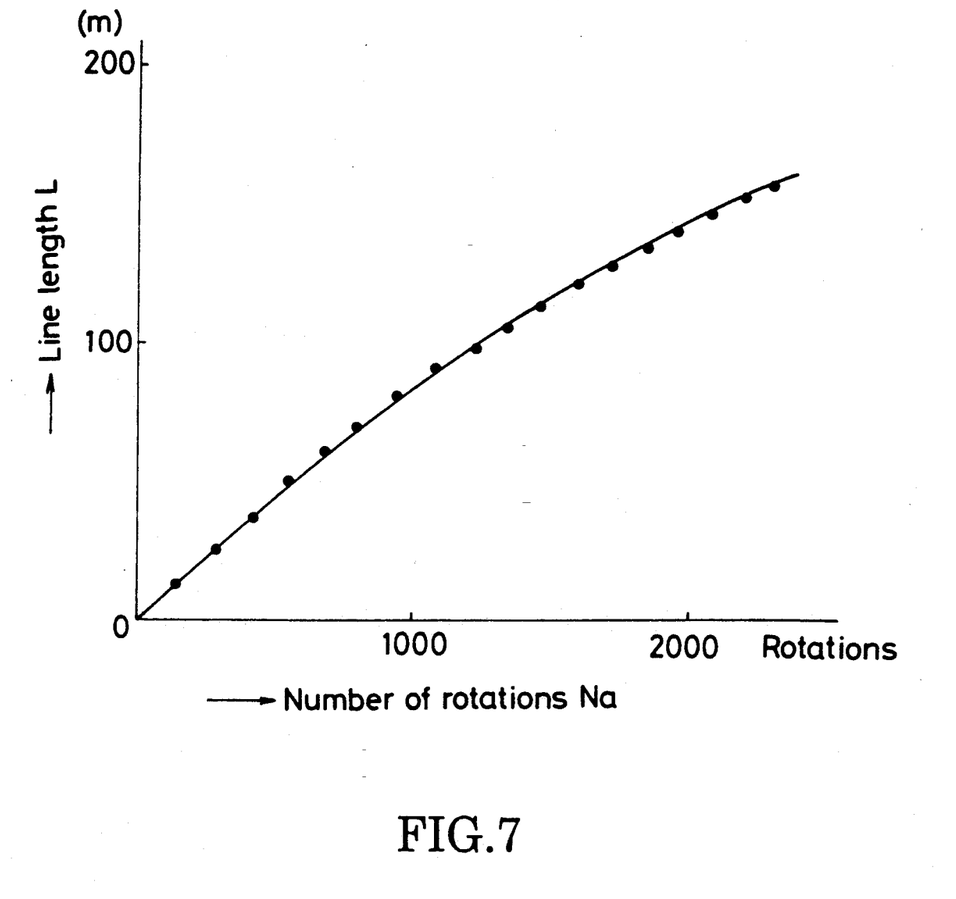
FIG. 7 is a graph showing the relation between the line length L and the number of spool rotations Na in a first embodiment of the invention.

FIG. 7 shows the relation between the rotation number Na and the line length L, with calculated values shown as a solid line and actually measured values shown with black dots. As shown clearly in the drawing, the difference between the actually measured values and the calculated values is extremely small and within 0.3%.

Correction of the total number of rotations N in the event of a line break is described now.

In this case, as shown in FIG. 6, the line is to be wound onto the spool 2 with the rotational operation of the handle 8 until the line end comes to the point immediately before the reel 1 or the rod end (Step S20). Then, in the next step S21, the mode switch 6 is pressed for setting the microcomputer 9 to the correction mode. Here, the display unit 5 shows the indication "correction" at the mode indicator 5c.

After the microcomputer 9 is set to the correction mode, when the data input switch 7 is pressed in the step S22, the remaining count value Nb set at the incremental/decremental counter 17 (the value obtained by subtracting the number of rotations of the spool 2 in winding the line to the line end from the number of spool rotations counted at the time of unwinding) is stored to the RAM 12 and the remaining count Nb is added to the number of rotations Na further counted by the incremental/decremental counter 17 for determination of the line length L. By pressing again the data input switch 7, the correction of the count value due to line break is terminated and the device returns to the original display mode.

FIG. 6 illustrates the operation when the fishing line 3 is unwound, and Nb should be subtracted when the fishing line 3 is wound.

Though a straight type spool 2 is described in the above embodiment, the line length can be measured with high accuracy also for a taper spool. For a taper spool where the winding width 1 of the spool 2 varies, the winding width of the bottom diameter $D_0$ and that of the prescribed winding diameter D shown in FIG. 3 are different, and it is necessary to set these winding diameter widths as constants in addition to D and H.

The constants in the line length determination formula change corresponding to the shape of the spool 2. Some constants corresponding to various spools 2 are to be stored in ROM 11 in advance, and the spool data in ROM 11 can be selectively set according to the spool 2 incorporated to the reel 1.

As shown above, the present invention determines the line length L by setting some constants determined by the spool shape and executing the line length measurement formula with using these constants and the total number of spool rotations when the fishing line is wound to the level prescribed for the spool and the actual number of spool rotations in unwinding or winding of the fishing line. This enables highly accurate measurement of unwound or wound line length regardless of the diameter or type of the fishing line. In addition, data to be input is only the total number of spool rotations when the fishing line is wound to the winding diameter prescribed for the spool and this data can be input in one action with the data input switch, which makes the data input operation very simple. Further, since the fishing line type is not limited, any type of line can be used. This makes the device usable in various fishing conditions and realizes high practicability.

Another embodiment where the fishing line's reaching a prescribed winding amount can be surely detected is now described.

Figure 8:
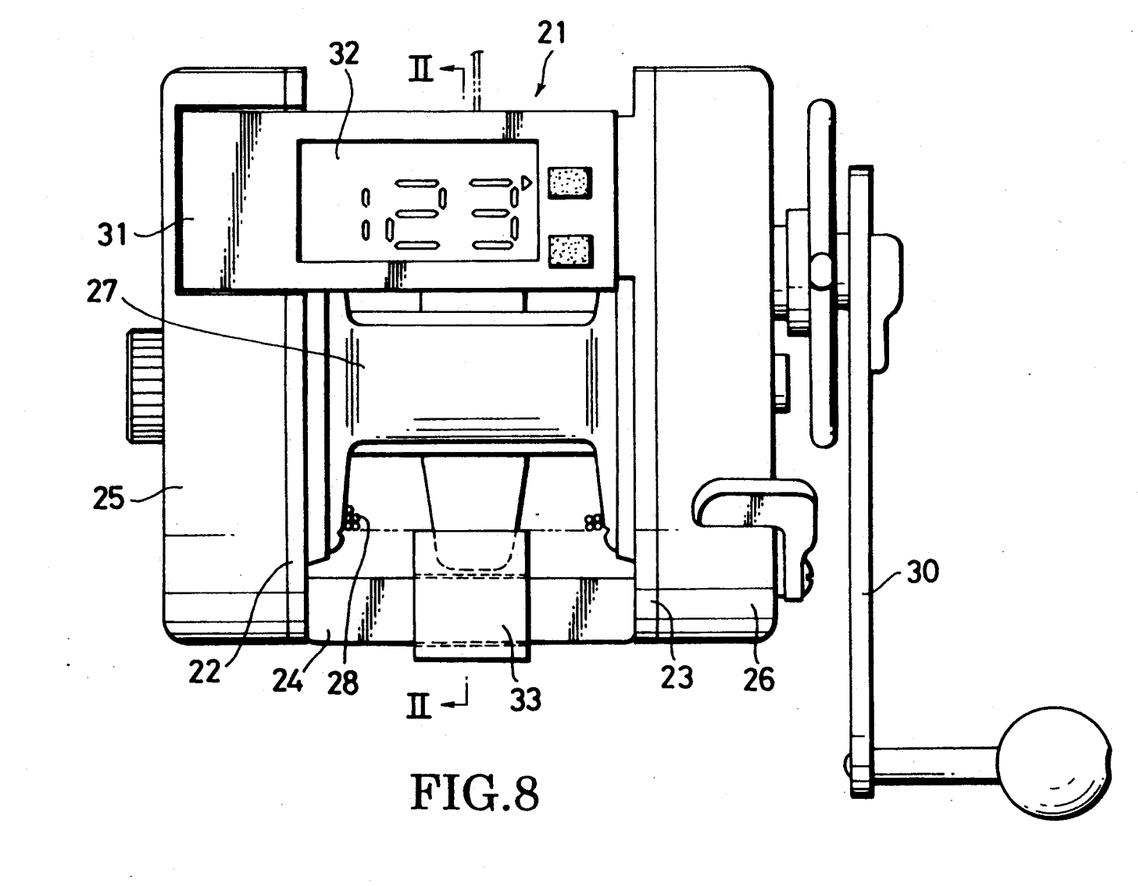
FIG. 8 is a plan view of a fishing reel according to a second embodiment of the invention.
Figure 9:
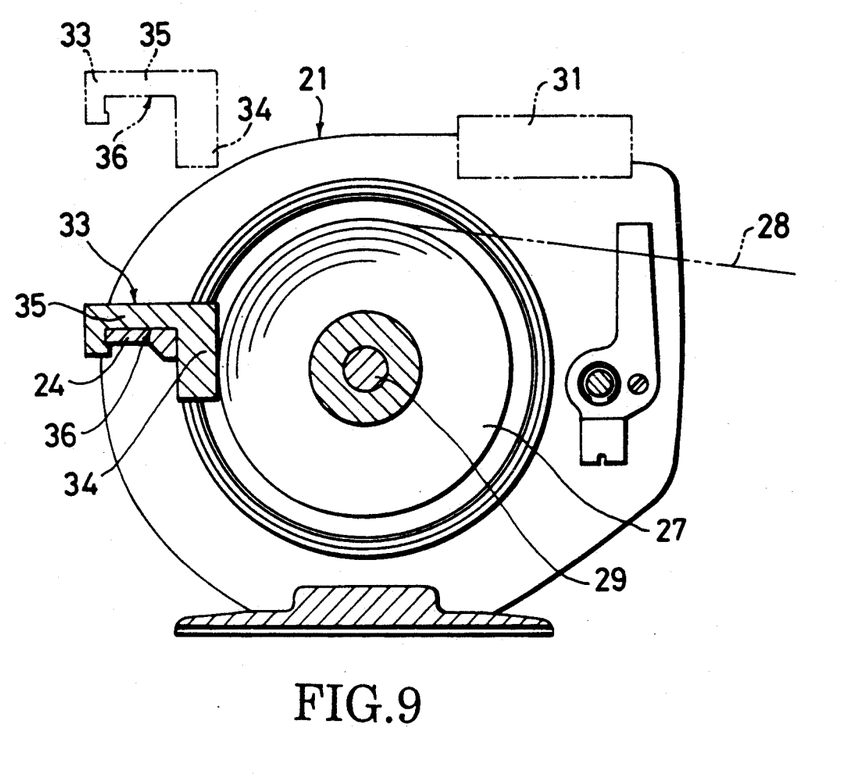
FIG. 9 is a transverse sectional view taken along the line IX—IX of FIG. 8.

FIGS. 8 and 9 show a second embodiment of the fishing reel of the present invention, with the reference numeral 21 indicating the reel.

The reel 21 is provided with right and left side frames 22 and 23 opposed with a predetermined interval and a support 24 connecting the frames 22 and 23.

The numeral 25 indicates the left side plate (also serving as a cover) mounted on the left side frame 22 of the reel 21, and the numeral 26 indicates the right side plate (also serving as a cover) mounted on the right side frame 23 of the reel 21.

The reference numeral 27 indicates a spool placed between the right and left side frames 22 and 23 of the reel 21. The spool 27 is wound with a fishing line 28 and provided with a spool shaft 29 fixed through the shaft center.

In these figures, the reference numeral 30 indicates a handle and 31 shows a control box.

The control box 31 is provided, for example, with a display unit 32 to indicate the length of the fishing line 28 released into the sea.

In this embodiment, the support 24 is provided, for example, with a prescribed winding amount detector 33 made of resin, which is detachably mounted.

The prescribed winding amount detector 33 has a section of L-letter shape, with one wing used as a contact 34 making contact with the fishing line 28 and the other wing used as an attachment 35.

The attachment 35 has an inside fitting point 36 for detachable fitting with the support 24.

The fishing reel formed as above has the reel 21 provided with a prescribed winding amount detector 33 which contacts with the fishing line 28 when the fishing line 28 wound onto the spool 27 reaches the prescribed winding amount for indication of the proper fishing line 28 winding. If the fishing line 28 reaches the prescribed winding amount, the contact 34 of the prescribed winding amount detector 33 makes contact with the fishing line and the handle 30 to wind the fishing line 28 becomes sluggish. This ensures the detection of the reaching by the fishing line 28 to the prescribed winding amount.

As a result, it becomes possible to surely eliminate the fear of biting, twisting and backlash caused by excessive winding of the fishing line 28.

The following table compares the winding amount accuracy using a conventional fishing reel with a winding prescription line at the spool and a fishing reel provided with the prescribed winding amount detector as described above. The column A shows values for a conventional fishing reel, and B shows those with a fishing reel as above. The numerals 1 to 8 show different subjects. Since the fishing reels A and B have some difference in reels, absolute length could not be compared.

TABLE

| | A | B |
|---|---|---|
| 1 | 114.7 | 122.0 |
| 2 | 115.4 | 124.7 |
| 3 | 129.4 | 119.8 |
| 4 | 138.4 | 116.1 |
| 5 | 144.5 | 127.9 |
| 6 | 132.1 | 116.5 |
| 7 | 144.5 | 126.7 |
| 8 | 144.5 | 119.1 |
| Average | 132.9 | 121.6 |
| Error | 12.45 | 4.49 |

From the above table, it is learned that the fishing reel of the present invention can reduce the variation in winding amount to one third of that with a conventional ones and the variation amount in length as described above can be reduced to about +/−5%.

Figure 10:
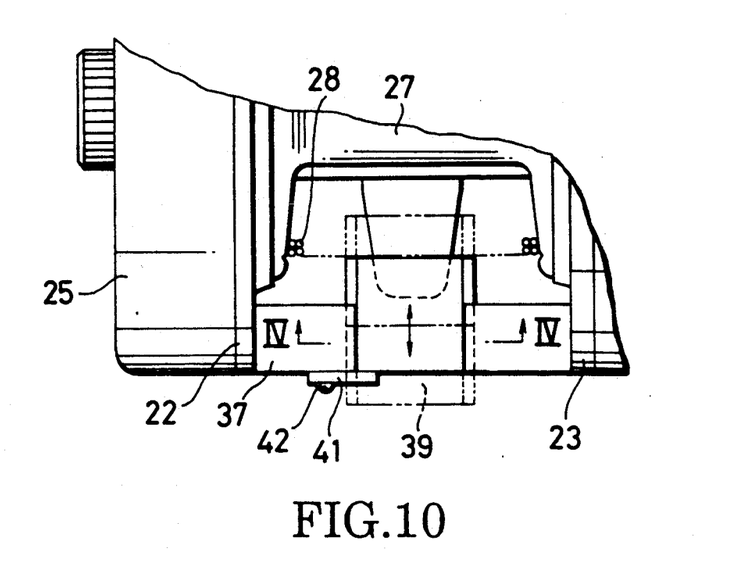
FIG. 10 is a plan view of a fishing reel according to a third embodiment of the invention.
Figure 11:
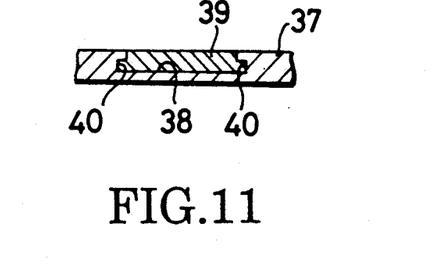
FIG. 11 is a transverse sectional view taken along the line XI—XI of FIG. 10.

FIGS. 10 and 11 illustrate a third embodiment of the fishing reel of the present invention. In this embodiment, a support 37 is provided with a guiding groove 38 where a prescribed winding amount detector 39 is fitted so that it can slide freely.

At the bottom of the guiding groove 38, a recess 40 is formed at each side of the groove to prevent the prescribed winding amount detector 39 from slipping out upward and a positioning stopper 41 is rotationally mounted with a screw 42 to prevent the prescribed winding amount detector 39 from projecting in the direction opposite to the spool 27 of the prescribed winding amount detector 39.

In the fishing reel formed as above, the prescribed winding amount detector 39 is inserted and fitted to the guiding groove 38 and the stopper 41 is rotated to be positioned at the position shown in the figure and then the fishing line 28 is wound onto the spool 27. Thus, the prescribed winding amount detector 39 gradually retreats and the retreat is stopped when the detector contacts the stopper 41. The tip of the prescribed winding amount detector 39 at this point becomes the winding prescription line and the fishing line 28 is wound similarly to the embodiment shown in FIG. 8.

In the fishing reel formed as above, too, almost the same effect as the embodiment shown in FIG. 8 can be obtained.

Figure 12:
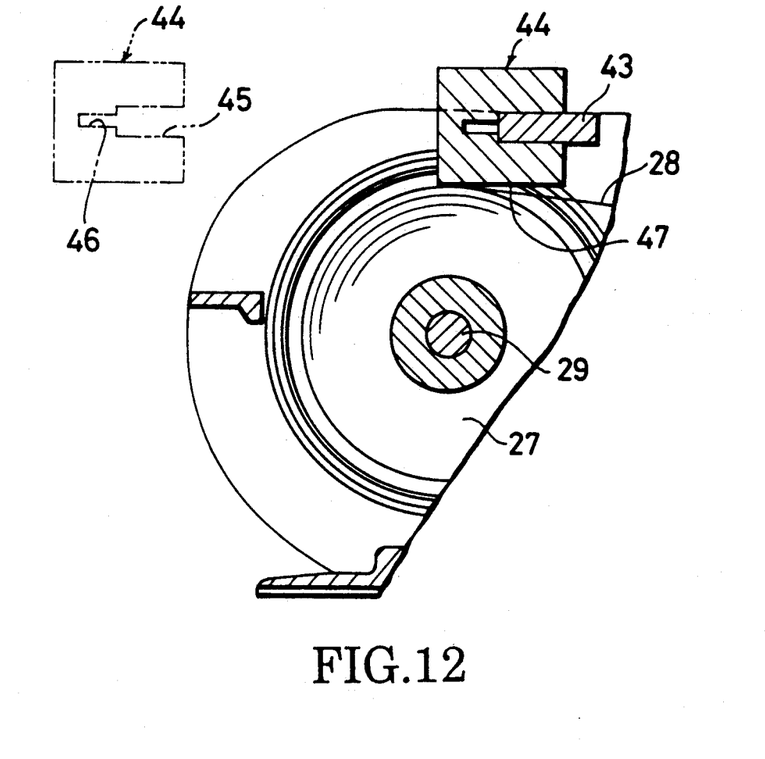
FIG. 12 is a plan view of a fishing reel according to a fourth embodiment of the invention.

FIG. 12 shows a fourth embodiment of the fishing reel of the present invention, where a support 43 detachably pinches a prescribed winding amount detector 44.

For example, the prescribed winding amount detector 44 made of elastic resin is formed into one piece provided with a groove 45 to accommodate the support 43 at the center. The bottom surface of the groove 45 has a relief groove 46 to provide a prescribed elasticity for pinching to the prescribed winding amount detector 44.

In the fishing reel formed as above, when the support 43 is fitted with the groove 45 of the prescribed winding amount detector 44, the bottom end of the prescribed winding amount detector 44 shown in the figure becomes the winding prescription line 47, and the fishing line is wound similarly to the embodiment shown in FIG. 8.

Thus, the fishing reel formed as described above can realize almost the same effect as the embodiment shown in FIG. 8.

Figure 13:
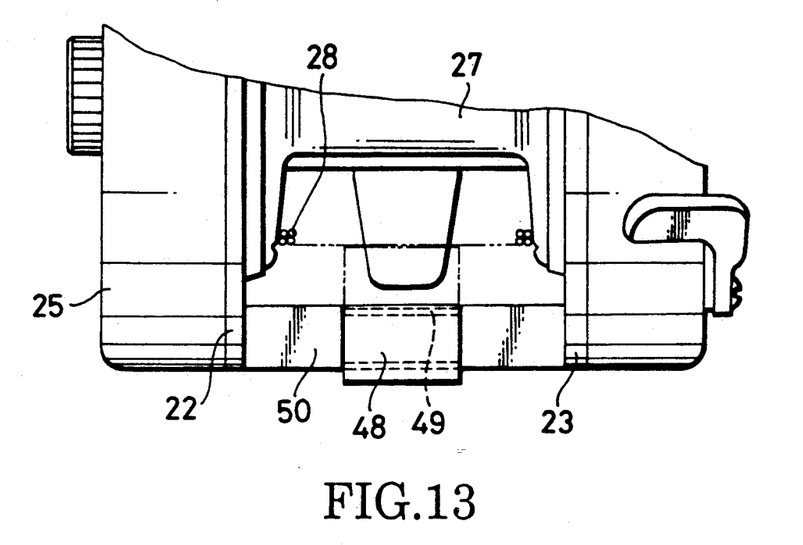
FIG. 13 is a plan view of a fishing reel according to a fifth embodiment of the invention.
Figure 14:
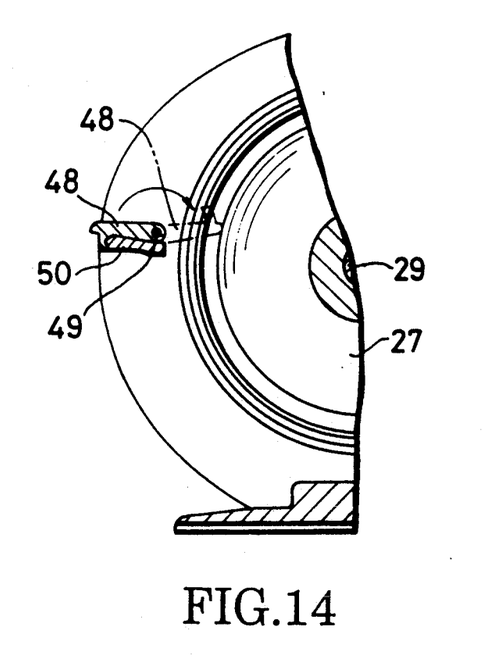
FIG. 14 is a transverse sectional view of FIG. 13.

FIGS. 13 and 14 show a fifth embodiment of the fishing reel of the present invention. In this embodiment, the prescribed winding amount detector 48 is rotationally supported by a support 50 via a pin member 49, and when the winding amount detector 48 rotates toward the side of the support 50, the prescribed winding amount detector 48 forms a part of the support.

In the fishing reel formed as described above, when the fishing line 28 is wound, the prescribed winding amount detector 48 rotates on the side of the spool 27 for about 180 degrees and the end of the prescribed winding amount detector 48 becomes the winding limit line for the fishing line winding similar to that in the embodiment in FIG. 8.

Thus, the fishing reel formed as described above can realize almost the same effect as the embodiment shown in FIG. 8.

Figure 15:
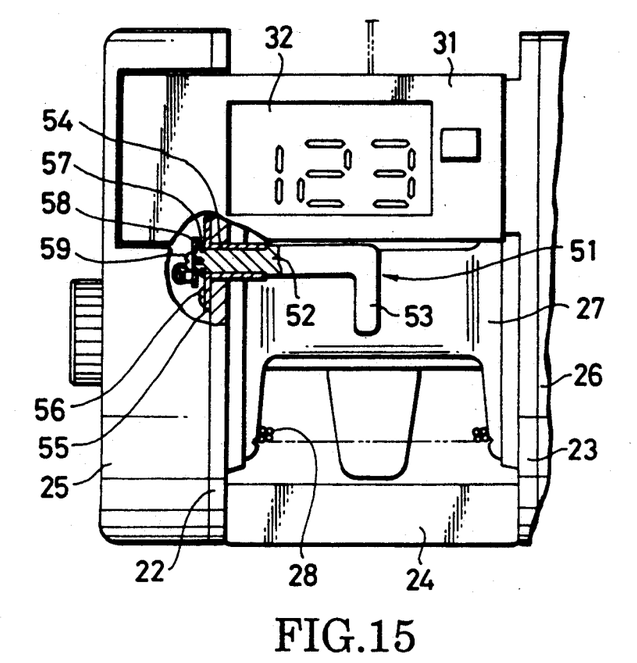
FIG. 15 is a plan view of a fishing reel according to a sixth embodiment of the invention.
Figure 16:
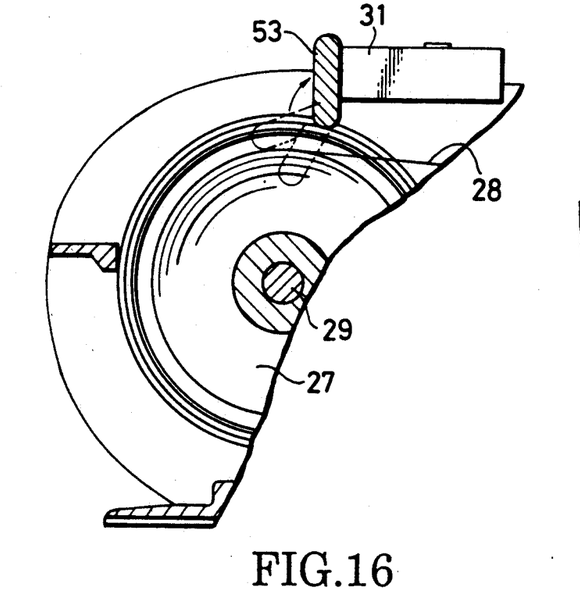
FIG. 16 is a transverse sectional view of FIG. 15.
Figure 17:
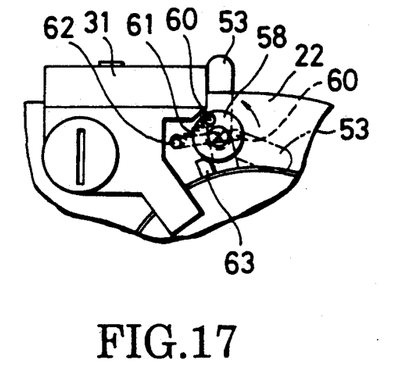
FIG. 17 is a detailed side view showing a rotation mechanism of a prescribed winding amount detector of FIG. 16.

FIGS. 15 to 17 illustrate a sixth embodiment of the fishing reel of the present invention. In this embodiment, a prescribed winding amount detector 51 consists of a shaft 52 and a detector 53 formed as a projection making a right angle with the shaft 52 at the end of the shaft 52.

To the left side frame 22, the shaft 52 of the prescribed winding amount detector 51 is inserted and a supporting member 54 rotationally supporting the prescribed winding amount detector 51 is placed through the side frame 22.

A flange 55 is formed at the left end of the support 54 and the flange 55 is fixed to the side frame 22 with a screw 56.

The movement of the shaft 52 of the prescribed winding amount detector 51 in the axial direction is restricted by the stop ring 57, and a rotational plate 58 is fixed to the end surface of the shaft 52 with a screw 59.

As shown in FIG. 17, the rotational plate 58 is provided with an integrally formed pin 60 projecting outward and to the pin 60, one end of the spring 61, which serves as a known straddled energizing spring is fixed.

The other end of the spring 61 is fixed to the pin 62 projecting outward from the side frame 22.

The side frame 22 is provided with a control member 63 formed as a projection making contact with the pin 60 formed on the rotational plate 58, to prevent excessive rotations of the prescribed winding amount detector 51 toward the side of the spool 27.

In the fishing reel formed as described above, when the fishing line is wound, the end of the detector 53 in the prescribed winding amount detector 51 makes contact with the outer circumference of the fishing line 28 wound onto the spool 27 under a predetermined pressure.

When the fishing line 28 wound onto the spool 27 reaches the prescribed winding amount, the rotation mechanism consisting of the spring 61 and other components rotates the detector 53 of the prescribed winding amount detector 51 to the predetermined position.

In this embodiment, as shown in FIG. 17, when the pin 60 of the rotational plate 58 comes to the position shown with a broken line in the figure, the spring 61 forming a straddled energizing spring rapidly rotates the rotational plate 58 toward the control box 31 and the detector 53 of the prescribed winding amount detector 51 makes contact with the front surface of the control box 31 and stops.

In the fishing reel formed as described above, the reel 21 is provided with a prescribed winding amount detector 51 which directs the proper winding amount for the fishing line 28 by rotating to the predetermined position when the fishing line 28 wound onto the spool 27 reaches the predetermined winding amount. When the fishing line 28 achieves the prescribed winding amount, the prescribed winding amount detector 51 rotates to the predetermined position and thus assures the detection of the achievement of the prescribed winding amount by the fishing line.

Although the invention has been described in its most preferred forms with a certain degree of particularity, it is understood that the present disclosure of the preferred forms has been changed in the details of construction and the combination and arrangement of parts may be resorted to without departing from the spirit and scope of the invention as hereinafter claimed.

What is claimed is:

1. A digitally computing fishing feel for selectively computing and displaying to the user of the reel a computed line length display of line unwound or wound during use even though the line is of indefinite line diameter, the reel comprising in combination:
    a spool rotationally supported by the reel, the spool being wound with a fishing line of indefinite diameter of type;
    a spool rotation sensor carried by the reel for detecting the direction of rotation and providing pulses for each rotation of the spool when winding or unwinding the line;
    a microcomputer contained within a housing of the reel, the microcomputer including:
        a CPU to control program memory;
        a ROM in which is stored for the CPU an operation processing program and a line length calculation formula corresponding to the shape of the spool by which unwound line length varies as a quadratic polynomial function of the number of rotations of the spool when being wound or unwound, the formula stored in the ROM having a first coefficient which is a first constant determined by the depth of line of the spool in winding the line from unwound to a prescribed winding diameter D, divided by the total number of rotations of the spool in being wound form the unwound to the prescribed winding diameter D, and a second coefficient corresponding to said prescribed winding diameter D, the formula stored in the ROM being irrespective of the actual line diameter of the line;
        a RAM to store data as results of operation by the CPU;
        an input interface for receiving pulses from the spool rotation sensor corresponding to each of N spool rotations;
        an incremental/decremental counter to count such spool rotations incrementally or decrementally in response to pulse signals generated by the sensor according to whether the line is winding or unwinding;
        an output interface to providing a calculated line length output;
        mode select means selectively operable by the user when the line is unwound for causing the microcomputer to be set to a total spool rotations input mode and the incremental/decremental counter to be set to an incremental status for counting as the unwound line si wound upon to the spool to the prescribed winding level diameter D at which winding of the line is suspended;
        data input select means selectively operable by the user when winding of the line is suspended for the causing the value of the incremental/decremental counter to be stored in the RAM as the total number of spool rotations N for use by the CPU in the formula stored in the ROM;
    the microcomputer thereby providing preprogrammed means for counting, in response to the mode select means, the total number of spool rotations of the spool as the line is wound on the spool to the prescribed winding diameter D, and for thereafter calculating, in response to the data input select means, the line length according to the formula stored in the ROM;
    a decoder for decoding the calculated line length to provide a calculated line length output;
    a digital display means presented by the reel housing and responsive to the decoder for displaying to the user the calculated line length during winding or unwinding of the line.

2. A digitally computing fishing reel according to claim 1 wherein the formula stored in the ROM is $$L = a/N\, N_a^2 + bN_a$$

where L is the calculated line length during winding or unwinding of the line, a is the groove depth of the spool in being wound from unwound to the prescribed winding diameter D, b relates to the prescribed winding diameter D, and $N_a$ is the actual number of rotations of the spool when it is rotated in unwinding or winding of the fishing line.

3. A fishing reel according to claim 1 wherein the reel further comprises a prescribed winding detector for indicating a condition of the fishing line having been wound to the prescribed winding diameter level.

4. A fishing reel according to claim 3 wherein the prescribed winding detector for indicating a condition of the fishing line having been wound to the prescribed winding diameter level comprises means for being contacted by the line only when wound to the prescribed winding diameter level.

5. A fishing reel according to claim 3 wherein the prescribed winding detector is a rotatable device carried by the reel for rotation from a first position to a second predetermined position only when the line is wound to the prescribed winding diameter level.

6. A digitally computing fishing reel for selectively computing and displaying to the user of the reel a computed line length display of line unwound or wound during use even though the line is of indefinite line diameter, the reel comprising in combination:
    a spool rotationally supported by the reel, the spool being wound with a fishing line of indefinite diameter or type;
    a spool rotation sensor carried by the reel for detecting the direction of rotation and providing pulses for each rotation of the spool when winding or unwinding the line;
    a microcomputer contained within a housing of the reel, the microcomputer including:
        a CPU to control program memory;
        a ROM in which is stored of the CPU an operation processing program and a line length calculation formula, the formula stored in the ROM corresponding to the shape of the spool by which unwound line length varies as a function of the number of rotations of the spool when being wound or unwound, and is determined by the prescribed winding diameter D, by the depth of line on the spool in winding the line from unwound to the prescribed winding diameter D, and by the total number of rotations of the spool in being wound from the unwound to the prescribed winding diameter D, the formula stored in the ROM being irrespective of the actual line diameter of the line;

a RAM to store data as results of operation by the CPU;

an input interface for receiving pulses from the spool rotation sensor corresponding to each of N spool rotations;

an incremental/decremental counter to count such spool rotations incrementally or decrementally in response to pulse signals generated by the sensor according to whether the line is winding or unwinding;

an output interface to providing a calculated line length output;

means selectively operable by the user when the line is unwound for causing the microcomputer to be set to a total spool rotations input mode and for counting as the unwound line is wound upon to the spool to the prescribed winding level diameter D at which winding of the line is suspended; and for thereafter causing the value of the incremental/decremental counter to be stored in the RAM as the total number of spool rotations N for use by the CPU in he formula stored in the ROM;

the microcomputer thereby providing preprogrammed means for counting, in response to the mode select means, the total number of spool rotations of the spool as the line is wound on the spool to the prescribed winding diameter D, and for thereafter calculating, in response to the data input select means, the line length according to the formula stored in the ROM;

display means presented by the reel housing and responsive to the microcomputer for displaying to the user the line length calculated by the microcomputer during winding or unwinding of the line.

* * * * *

UNITED STATES PATENT AND TRADEMARK OFFICE
CERTIFICATE OF CORRECTION

PATENT NO. : 5,236,147
DATED : August 17, 1993
INVENTOR(S) : Kyoichi Kaneko

It is certified that error appears in the above-identified patent and that said Letters Patent is hereby corrected as shown below:

In the Claims

Column 9, line 43, replace "form" with --from--;

line 66, replace "si" with --is--.

Column 10, line 63, replace "of" with --for--.

Column 12, line 8, replace "he" with --the--.

Signed and Sealed this

Twelfth Day of April, 1994

Attest:

BRUCE LEHMAN

Attesting Officer     Commissioner of Patents and Trademarks